(12) United States Patent
Kaltenbach

(10) Patent No.: US 9,279,498 B2
(45) Date of Patent: Mar. 8, 2016

(54) POWERSHIFT TRANSMISSION AND METHOD FOR OPERATION THEREOF

(71) Applicant: ZF Friedrichshafen AG, Friedrichshafen (DE)

(72) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/642,807

(22) Filed: Mar. 10, 2015

(65) Prior Publication Data
US 2015/0267810 A1 Sep. 24, 2015

(30) Foreign Application Priority Data
Mar. 21, 2014 (DE) .......................... 10 2014 205 275

(51) Int. Cl.
| | |
|---|---|
| *F16H 61/688* | (2006.01) |
| *F16H 37/04* | (2006.01) |
| *F16H 61/04* | (2006.01) |
| *F16H 61/686* | (2006.01) |

(52) U.S. Cl.
CPC ............ *F16H 61/688* (2013.01); *F16H 37/046* (2013.01); *F16H 61/04* (2013.01); *F16H 61/686* (2013.01); *F16H 2037/048* (2013.01); *F16H 2037/049* (2013.01); *F16H 2200/2005* (2013.01); *F16H 2200/2094* (2013.01)

(58) Field of Classification Search
CPC ................ F16H 37/046; F16H 37/065; F16H 2037/048; F16H 2037/049; F16H 61/686; F16H 61/688; F16H 2200/2094
See application file for complete search history.

(56) References Cited

U.S. PATENT DOCUMENTS

| | | | | |
|---|---|---|---|---|
| 8,408,084 | B2 * | 4/2013 | Gitt et al. ......................... | 74/330 |
| 2011/0259147 | A1 * | 10/2011 | Hoffmann ....................... | 74/745 |

(Continued)

FOREIGN PATENT DOCUMENTS

| | | |
|---|---|---|
| DE | 10260179 A1 | 7/2004 |
| DE | 102005018978 A1 | 11/2006 |

(Continued)

OTHER PUBLICATIONS

German Search Report issued in corresponding German Patent Application No. 10 2014 205 275.0 mailed Mar. 11, 2015.

*Primary Examiner* — Huan Le
(74) *Attorney, Agent, or Firm* — Davis & Bujold, P.L.L.C.; Michael J. Bujold

(57) ABSTRACT

A powershift transmission with a dual-clutch main transmission and a downstream planetary gearset transmission. The main transmission has first and second partial transmissions. Each partial transmission has an input shaft, an interlocking shifting element, an independent frictional powershift clutch, and a common output shaft. The downstream transmission has an input shaft which can be connected, via a third interlocking shifting element, to the common output shaft which is fixedly connected to a first planetary gearset element. The downstream transmission has an output shaft, which is connected to a second planetary gearset element. A third planetary gearset element can be coupled to a housing by a fourth interlocking shifting element or to the output shaft of the downstream transmission by a fifth interlocking shifting element. The common output shaft can be coupled by a sixth interlocking shifting element to the third planetary gearset element.

7 Claims, 4 Drawing Sheets

(56) References Cited

U.S. PATENT DOCUMENTS

2012/0216639 A1* 8/2012 Renner .................. 74/331
2014/0038769 A1* 2/2014 Kaltenbach et al. ......... 475/302
2014/0305239 A1 10/2014 Lubke et al.

FOREIGN PATENT DOCUMENTS

| DE | 10 2007 047 671 A1 | 4/2009 |
| DE | 102008031456 A1 | 1/2010 |
| DE | 102011088396 A1 | 6/2013 |

* cited by examiner

| GEAR | K1 | K2 | A | B | C | D | E | F | G | R | L | H | i | phi |
|---|---|---|---|---|---|---|---|---|---|---|---|---|---|---|
| 1 | X |   |   |   | X |   |   | X |   |   | X |   | 16.26 |   |
| 2 |   | X | X |   |   |   |   | X |   |   | X |   | 11.45 | 1.42 |
| 3 | X |   |   |   |   | X | X |   |   |   | X |   | 8.07 | 1.42 |
| 4 |   | X | X |   |   |   |   | X |   |   | X |   | 5.68 | 1.42 |
| 5 | X |   |   |   |   | X |   |   |   |   | X |   | 4.00 | 1.42 |
| 6 |   | X | X |   |   |   |   |   | X |   |   | X | 2.86 | 1.40 |
| 7 | X |   |   |   |   |   | X | X |   |   |   | X | 2.02 | 1.42 |
| 8 |   | X | X |   |   |   |   |   | X |   |   | X | 1.42 | 1.42 |
| 9 | X |   |   |   |   | X |   |   |   |   |   | X | 1.00 | 1.42 |
| 10 |   | X | X |   |   | X | X |   |   |   |   | X | 0.70 | 1.42 |
| R1 | X |   |   |   | X |   |   |   |   | X | X |   | -16.26 |   |
| R2 |   | X | X |   |   |   |   |   |   | X | X |   | -11.45 | 1.42 |
| R3 | X |   |   |   |   |   | X |   |   | X | X |   | -8.07 | 1.42 |
| R4 |   | X | X |   |   |   |   |   |   | X | X |   | -5.68 | 1.42 |

Fig. 2

| GEAR | K1 | K2 | A | B | C | D | E | F | G | R | L | H | i | phi |
|---|---|---|---|---|---|---|---|---|---|---|---|---|---|---|
| 1 | X |   |   |   | X |   |   | X |   |   | X |   | 16.26 |   |
| 2 |   | X | X |   |   |   |   | X |   |   | X |   | 11.45 | 1.42 |
| 3 | X |   |   |   |   | X | X |   |   |   | X |   | 8.07 | 1.42 |
| 4 |   | X | X |   |   |   |   | X |   |   | X |   | 5.68 | 1.42 |
| 5 | X |   |   |   |   | X |   |   |   |   | X |   | 4.00 | 1.42 |
| 6 |   | X | X |   |   |   |   |   | X |   |   | X | 2.86 | 1.40 |
| 7 | X |   |   |   |   |   | X | X |   |   |   | X | 2.02 | 1.42 |
| 8 |   | X | X |   |   |   |   |   | X |   |   | X | 1.42 | 1.42 |
| 9 | X | X | X |   |   | X |   |   | X |   |   |   | 1.29 | 1.11 |
| 10 | X |   |   |   |   | X |   |   |   |   |   | X | 1.00 | 1.29 |
| 11 |   | X | X |   |   | X | X |   |   |   |   | X | 0.70 | 1.42 |
| R1 | X |   |   |   | X |   |   |   |   | X | X |   | -16.26 |   |
| R2 |   | X | X |   |   |   |   |   |   | X | X |   | -11.45 | 1.42 |
| R3 | X |   |   |   |   |   | X |   |   | X | X |   | -8.07 | 1.42 |
| R4 |   | X | X |   |   |   |   |   |   | X | X |   | -5.68 | 1.42 |

Fig. 3

| GEAR | K1 | K2 | A | B | C | D | E | F | G | R | L | H | i | phi |
|---|---|---|---|---|---|---|---|---|---|---|---|---|---|---|
| 1 | X | | | (X) | X | | | X | | | X | | 16.67 | |
| 2 | | X | | X | | | (X) | X | | | X | | 12.17 | 1.37 |
| 3 | X | | (X) | | | | X | X | | | X | | 8.88 | 1.37 |
| 4 | | X | X | | | (X) | | X | | | X | | 6.49 | 1.37 |
| 5 | X | | | (X) | | X | | | (X) | | X | | 4.75 | 1.37 |
| 6 | X | | | (X) | X | | | | X | | | X | 3.51 | 1.35 |
| 7 | | X | | X | | (X) | | | X | | | X | 2.56 | 1.37 |
| 8 | X | | | (X) | X | X | | | X | | | | 2.30 | 1.12 |
| 9 | X | | (X) | | | | X | | X | | | X | 1.87 | 1.23 |
| 10 | X | | (X) | | | X | X | | X | | | | 1.58 | 1.18 |
| 11 | | X | X | | | (X) | | | X | | | X | 1.37 | 1.16 |
| 12 | X | X | X | | | X | | | X | | | | 1.27 | 1.08 |
| 13 | X | | (X) | | | X | | | X | | | X | 1.00 | 1.27 |
| 14 | | X | X | | X | X | | | X | | | | 0.89 | 1.12 |
| 15 | | X | X | | | X | X | | | | | X | 0.73 | 1.22 |
| R1 | X | | | (X) | X | | | | | X | X | | -16.67 | |
| R2 | | X | | X | | | (X) | | | X | X | | -12.17 | 1.37 |
| R3 | X | | (X) | | | | X | | | X | X | | -8.88 | 1.37 |
| R4 | | X | X | | | (X) | | | | X | X | | -6.49 | 1.37 |

POWERSHIFT TRANSMISSION AND METHOD FOR OPERATION THEREOF

This application claims priority from German patent application Ser. No. 10 2014 205 275.0 filed Mar. 21, 2014.

FIELD OF THE INVENTION

The invention concerns a powershift transmission and methods for its operation.

BACKGROUND OF THE INVENTION

DE 10 2007 047 671 A1 describes a powershift transmission for a motor vehicle, having a main transmission in the form of a dual-clutch transmission and a downstream transmission in the form of a planetary gearset connected downstream from the main transmission. The main transmission comprises a first partial transmission and a second partial transmission, wherein a first main transmission input shaft of the first partial transmission is associated with a first frictional powershift clutch and a separate, second main transmission input shaft of the second partial transmission is associated with a second frictional powershift clutch. Each of the two partial transmissions of the main transmission in the form of a dual-clutch transmission comprises, respectively, at least one interlocking shifting element. For the two partial transmissions a common main transmission output shaft is provided. The downstream transmission in the form of a planetary gearset comprises a downstream transmission input shaft and a downstream transmission output shaft. The output shaft of the main transmission can be coupled by means of an interlocking shifting element to a first planetary gearset element of the downstream transmission. A second planetary gearset element of the downstream transmission is connected fixed to the output shaft of the downstream transmission. A third planetary gearset element of the downstream transmission can be coupled by means of further interlocking shifting elements either to a transmission housing or to the output shaft of the downstream transmission and therefore also to the second planetary gearset element, which is connected in a fixed manner to the output shaft of the downstream transmission.

In the powershift transmission known from DE 10 2007 047 671 A1 the downstream transmission, which is in the form of a planetary gearset, serves exclusively as a fixed gear ratio, so that only non power-branched gears can be obtained.

SUMMARY OF THE INVENTION

Starting from there, the purpose of the present invention is to provide a new type of powershift transmission in which, in addition to non power-branched gears, superposition gears too, and therefore power-branched gears can be used, with methods for operating the transmission.

This objective is achieved by a powershift transmission described below. According to the invention the, or each common main transmission output shaft for the two partial transmissions of the main transmission can be coupled by means of a sixth interlocking shifting element to the third planetary gearset element of the downstream transmission, which can be coupled to the transmission housing by means of the fourth, interlocking shifting element.

In the downstream transmissions according to the invention, both non power-branched and power-branched gears, the latter called superposition gears, can be obtained and used.

In an advantageous further development the powershift transmission provides at least one first superposition gear in which both of the frictional powershift clutches are closed, in order to enable driving by the formation of a first force or torque flow path starting from the first powershift clutch, via the first partial transmission and into the first planetary gearset element, and at the same time by the formation of a second force or torque flow path starting from the second powershift clutch, via the second partial transmission and into the third planetary gearset element, so that in this case the fourth and fifth shifting elements are both open.

Such a superposition gear, in which both frictional powershift clutches are closed, is particularly suitable for use in trucks driving up a slight incline.

Preferably the powershift transmission has at least one second superposition gear in which only one of the frictional powershift clutches is closed, in order to enable driving by forming a first force or torque flow path starting from the respective closed powershift clutch, via the first partial transmission and into the first planetary gearset element, and at the same time by forming a second force or torque flow path starting from the closed powershift clutch, via the second partial transmission and into the third planetary gearset element, such that in this case the fourth shifting element and the fifth shifting element are both open.

Each superposition gear enables a finer gradation of the gear intervals, namely when the High driving range is active in the downstream transmission. Such finely graded gear intervals are, in particular, appropriate while driving at an approximately constant speed, since the rotational speed of the drive aggregate can be adjusted more finely so that the drive aggregate can be operated in a fuel-saving manner.

In an advantageous further development, the fifth shifting element is an interlocking shifting element. In this variant, in which there are only two interlocking shifting elements, a particularly preferred and simpler structure of the powershift transmission with a particularly preferred mode of operation can be provided.

Methods for the operation of the powershift transmission according to the invention are described below. These methods are preferably used in combination with one another in a powershift transmission according to the invention.

BRIEF DESCRIPTION OF THE DRAWINGS

Preferred further developments emerge from the description given below. Example embodiments of the invention, to which it is not limited, are explained in more detail with reference to the drawing, which shows:

FIG. 2: A first shifting matrix for the powershift transmission of FIG. 1;

FIG. 3: A second shifting matrix for the powershift transmission of FIG. 1;

FIG. 4: A third shifting matrix for the powershift transmission of FIG. 1; and

FIG. 5: A matrix showing the possible powershifts in the shifting matrix of FIG. 4.

DETAILED DESCRIPTION OF THE PREFERRED EMBODIMENTS

Figure 1:
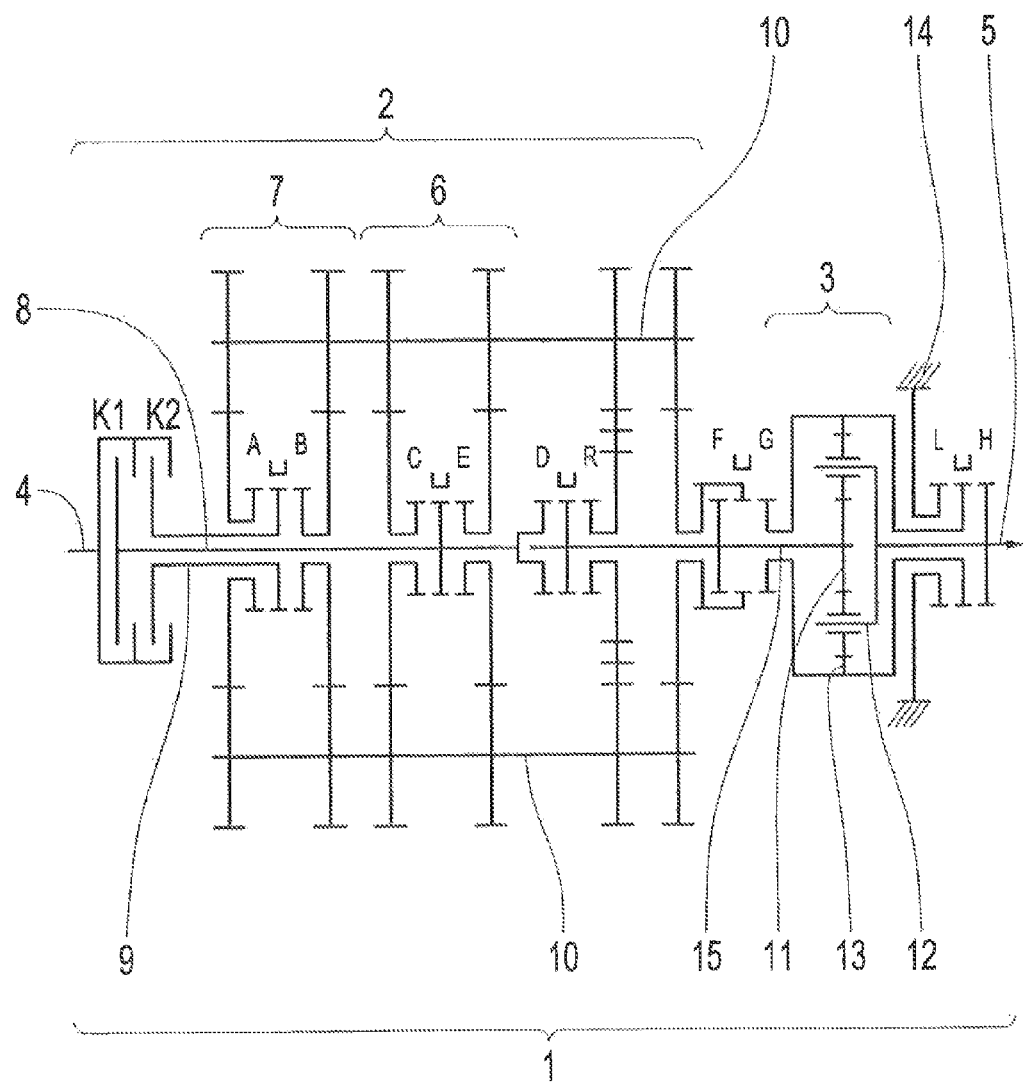
FIG. 1: A layout of a powershift transmission according to the invention.

The present invention concerns a powershift transmission for a motor vehicle and methods for its operation, namely methods for enabling powershift processes between power-branched gears and non power-branched gears of the powershift transmission, the power-branched gears also being known as superposition gears.

FIG. 1 shows a schematic representation of a powershift transmission 1 which comprises a main transmission 2 in the form of a dual-clutch transmission and a downstream transmission 3 in the form of a planetary gearset connected downstream from the main transmission 2.

The powershift transmission 1 has a drive input shaft 4 and a drive output shaft 5. A drive aggregate of the motor vehicle can be coupled to the drive input shaft 4. A drive output of the motor vehicle can be coupled to the drive output shaft 5.

The main transmission 2 designed as a dual-clutch transmission comprises two partial transmissions, namely a first partial transmission 6 and a second partial transmission 7.

The first partial transmission 6 has a first main transmission input shaft 8, which is associated with a first frictional powershift clutch K1. When this first frictional powershift clutch K1 is closed, the drive input shaft 4 is coupled to the first main transmission input shaft 8 of the first partial transmission 6. Furthermore, the first partial transmission 6 has a plurality of first, interlocking shifting elements C, E, D.

The second partial transmission 7, which comprises second, interlocking shifting elements A and B, has a second main transmission input shaft 9 which is associated with a second frictional powershift clutch K2. When the second frictional powershift clutch K2 is closed, the drive output shaft 4 is coupled to the second main transmission input shaft 9.

In the example embodiment shown, the two main transmission input shafts 8 and 9 of the two partial transmissions 6 and 7 of the main transmission 2 extend coaxially with one another, with the second main transmission input shaft 9 surrounding part of the first main transmission input shaft 8 concentrically on the outside.

At least one main transmission output shaft 10 common to both of the partial transmissions 6 and 7 of the main transmission 2 co-operates with the two partial transmissions 6, 7, and in the example embodiment shown there are two countershafts which form such main transmission output shafts 10.

The downstream transmission 3, in the form of a planetary gearset, comprises a downstream transmission input shaft 15 to which the, or each main transmission output shaft 10 can be coupled by means of a third interlocking shifting element F. When the third interlocking shifting element F is closed, the main transmission output shafts 10 are coupled to the downstream transmission input shaft 15.

The input shaft 15 of the downstream transmission is connected in a fixed manner to a first planetary gearset element 11 of the downstream transmission 3, namely to a sun gear thereof in the example embodiment shown.

In addition the downstream transmission 3 has a downstream transmission output shaft 5, which constitutes the drive output shaft 5 of the powershift transmission 1, this drive output shaft or downstream transmission output shaft 5 is connected in a fixed manner to a second planetary gearset element 12 of the downstream transmission 3, namely to a carrier of the downstream transmission 3 in FIG. 1.

The downstream transmission 3 also has a third planetary gearset element 13, this being a ring gear in the example embodiment of FIG. 1. Depending on the shift position of two further interlocking shifting elements L and H, the planetary gearset element 13 is coupled either to a transmission housing 14 or to the output shaft of the downstream transmission, or drive output shaft 5. When a fourth interlocking shifting element L is closed, the third planetary gearset element 13 is coupled to the transmission housing 14 so that a so-termed Low driving range is engaged in the downstream transmission 3. In contrast, when a fifth interlocking shifting element H is closed, which in the preferred example embodiment shown is also in the form of an interlocking shifting element, the third planetary gearset element 13 of the downstream transmission 3 is coupled to the drive output shaft 5 so that a so-termed High driving range is engaged in the downstream transmission 3. The blocking of the downstream transmission 3 achieved in this way can in principle be achieved by connecting any two elements of the planetary gearset.

The last two wheel planes of the main transmission 2 formed as a dual-clutch transmission, which contain the interlocking shifting element R, serve as drive input constants such that to obtain reversing gears the shifting element R is closed and to obtain forward gears the interlocking shifting element R is open.

In the multi-speed transmission 1 according to the invention the, or each main transmission output shaft 10 common to the two partial transmissions 6, 7 of the main transmission 2 can be coupled by means of a sixth, interlocking shifting element G to the third planetary gearset element 13 of the downstream transmission 3, in FIG. 1 therefore to the ring gear thereof, whereas this third planetary gearset element 13 can be coupled by means of the fourth, interlocking shifting element L to the transmission housing 14.

As already explained above, the or each main transmission output shaft 10 of the two partial transmissions 6, 7 of the main transmission 2 can be coupled by means of the interlocking shifting element G to that planetary gearset element of the downstream transmission 3 which is connected to the transmission housing 14 when the Low driving range of the range group 3 is active. In the powershift transmission 1 both the input shaft 15 of the downstream transmission or first planetary gearset element 11, and also the third planetary gearset element 13 which is braked and at rest in the Low driving range, are driven in order to produce power-branched or superposition gears.

The powershift transmission 1 according to the invention is independent of the specific design of the main transmission 2 made as a dual-clutch transmission, namely independent of the gearsets of the main transmission 2. Otherwise than in the dual-clutch transmission 2 shown in FIG. 1, a main transmission 2 can be used which is exclusively of planetary design or which is a mixed design combining a planetary design with countershafts. Otherwise than in the example embodiment of FIG. 1, there may be only one countershaft.

However, for the invention it is necessary that the two frictional powershift clutches K1 and K2 which co-operate with the two partial transmissions 6 and 7 of the main transmission 2, are present and that a planetary gearset is used as the downstream transmission 3, with which the interlocking shifting element G is associated in such manner that when the shifting element G is closed, the or each main transmission output shaft 10 can be coupled to the third planetary gearset element 13, which is coupled to the transmission housing 14 when the Low driving range is engaged in the downstream transmission 3.

With the powershift transmission shown in FIG. 1, for example the shifting matrix of FIG. 2 with ten forward gears 1 to 10 and four reverse gears R1 to R4 can be obtained, in which matrix an X in the columns K1, K2, A. B, C, D, E, F, G, R, L, H indicates that the shifting element concerned is closed. The column i shows the transmission ratio of the gear concerned and the column phi shows the gradation. The numerical values given in the columns i and phi are shown purely as examples.

With the powershift transmission of FIG. 1 superposition gears can be obtained. In a first superposition gear both of the frictional powershift clutches K1 and K2 are closed, in order to enable driving by the formation of a first force or torque flow path starting from the first powershift clutch K1, via the first partial transmission 6 and into the first planetary gearset element 11, and at the same time by the formation of a second force or torque flow path starting from the second powershift clutch K2, via the second partial transmission 7 and into the third planetary gearset element 13, such that in the first superposition gear the fourth interlocking shifting element L and the fifth interlocking shifting element H are both open. Thus, FIG. 3 shows a shifting matrix for the powershift transmission of FIG. 1 in which a first superposition gear of this type is provided, the first superposition gear being forward gear 9 in the shifting matrix of FIG. 3.

Thus, in the superposition gear 9 of FIG. 3 the first planetary gearset element 11 of the downstream transmission 3 is driven by way of the first frictional powershift clutch K1 and the first partial transmission 6 in the shift position of the so-termed direct gear (shifting element D). The third planetary gearset element 13 of the downstream transmission 3 is driven starting from the second frictional clutch K2, via the second partial transmission 7 in one of the two gears of the second partial transmission, namely in gear 9 of the shifting matrix of FIG. 3 by mans of the shifting element A. The shifting elements L and H of the downstream transmission 3 are both open, while both frictional powershift clutches K1 and K2 are closed. This first superposition gear 9 is adjacent to the direct gear (gear 10) and can in particular be selected in trucks driving up a slight incline. Such a fine gear gradation close to the direct gear (gear 10) is advantageous, since at a given driving speed the rotational speed of the drive aggregate can be finely graded.

Furthermore, this first superposition gear 9 has high efficiency since the downstream transmission 3 has a high coupling power fraction and the force or torque flow passes in part by way of the first frictional powershift clutch K1 and the direct gear.

In the powershift transmission of FIG. 1 full powershifting ability is available between gears 8 and 10, namely by means of the shift between the powershift clutches K1 and K2 during which the superposition gear 9 is skipped over.

The first superposition gear 9, in which both powershift clutches K1 and K2 are closed, cannot be fully powershifted; rather, between gears 8 and 9 full powershifting is only possible in the traction operation range and between the gears 9 and 10 full powershifting is only possible in the overdrive operation range.

Thus, between gears 8 and 9 the powershift clutch K1 is the clutch to be engaged and the clutch to be disengaged is the interlocking shifting element H, so that a traction upshift from gear 8 to gear 9 and a traction downshift from gear 9 to gear 8 can in each case be carried out as a powershift, since during this only the first powershift clutch K1 performs friction work.

In a gearshift between gears 9 and 10 the interlocking shifting element H is the clutch to be engaged and the first powershift clutch K1 is the clutch to be disengaged, so that an overdrive upshift from gear 9 to gear 10 can be carried out in each case directly as a powershift, since during this as well, only the powershift clutch K1 performs friction work.

To be able also to carry out shifts between the gears 8 and 9 as overdrive shifts and gearshifts between gears 9 and 10 as traction shifts, the methods claimed in Claims 7 to 10 are proposed, which are preferably used in combination with one another depending on the shift to be carried out in a powershift transmission 1 that has such a first superposition gear in which both of the powershift clutches K1 and K2 are closed.

To carry out a traction upshift starting from the superposition gear 9 to the gear next-higher relative to the superposition gear, namely gear 10, first a traction downshift is carried out to the gear 8 which is next-lower relative to the superposition gear 9, and immediately thereafter, in the sense of a traction upshift that skips over the superposition gear 9, a shift is carried out from the gear 8 next-lower relative to the superposition gear 9 to the next-higher gear 10. As a result of the small gear interval between the gears 8 and 9 the rotational speed increase resulting from the initially performed traction downshift is virtually imperceptible.

To carry out an overdrive downshift starting from the first superposition gear 9 to the gear 8 next-lower relative to the superposition gear, first an overdrive upshift is carried out to the next-higher gear 10 relative to the superposition gear 9, and immediately thereafter an overdrive downshift starting from the next-higher gear 10 to the next-lower gear 8 while skipping over the superposition gear 9 is carried out, and in this case too as a result of the small gear interval the initial reduction of the rotational speed is virtually imperceptible.

To carry out an overdrive upshift to the first superposition gear 9 starting from the gear 8 next-lower relative to the superposition gear, first an overdrive upshift that skips over the superposition gear 9 is carried out to the gear 10 next-higher relative to the superposition gear 9, and then, in the sense of an overdrive downshift from that next-higher gear 10 a shift is carried out to the superposition gear 9. Owing to the small gear interval between gear 10 and gear 9, the related rotational speed changes are imperceptible.

To carry out a traction downshift to the first superposition gear 9 starting from the next-higher gear 10, first a traction downshift is carried out to the gear 8 next-lower than the superposition gear 9, the superposition gear 9 being skipped over, and immediately thereafter a traction upshift is carried out from the gear next-lower relative to the superposition gear 9 to the superposition gear 9. Again, owing to the small gear interval between gears 8 and 9 the related rotational speed changes are hardly perceptible.

The above process-related details apply generally to all the gearsets of the dual-clutch transmission that constitutes the main transmission 2, in which as the downstream transmission 3 a superposition transmission is used, i.e. in which the first partial transmission 6 drives the first planetary gearset element 11, in this case the sun gear, and the second partial transmission 7 drives the third planetary gearset element 13, in this case the ring gear, and in which the shifting element H is an interlocking shifting element.

In a variant of the powershift transmission 1 according to the invention, if the shifting element H is in the form of a frictional shifting element, all the gearshifts can be carried out as conventional powershifts so that the methods defined in the claims are not used. When the shifting element H is in the form of a frictional shifting element, it can connect any two planetary gearset elements of the superposition transmission 3 in order to block the planetary gearset or downshift transmission 3 so that the latter will have a gear ratio of 1.

FIG. 4 shows another shifting matrix which can be used for the powershift transmission of FIG. 1, such that in the shifting matrix of FIG. 4, in addition to the first superposition gear in which both frictional powershift clutches K1 and K2 are closed, second superposition gears are provided.

The first superposition gear, which in the shifting matrix of FIG. 3 is gear 9, is gear 12 in the shifting matrix of FIG. 4.

Gears 8, 10 and 14 of the shifting matrix of FIG. 4 are second superposition gears in which only one of the two frictional powershift clutches K1 and K2 is closed. In these superposition gears, driving is enabled by the formation of a first force and torque flow path starting from the respective powershift clutch K1 or K2 which is closed, via the first partial transmission 6 and into the first planetary gearset element 11, and at the same time by the formation of a second force and torque flow starting from the respective powershift clutch K1 or K2 which is closed, via the second partial transmission 7 and into the third planetary gearset element 13, in this case again with the shifting elements L and H both open.

In this case an identical gear gradation can be provided for the powershift transmission 1 in forward gears 1 to 7, whereas the gear gradation from gear 8 upward is finer, namely due to the addition of the four superposition gears 8, 10, 12 and 14 to the shifting matrix of FIG. 4. These fine gear intervals are preferred during long journeys at an approximately constant speed, since the rotational speed of the drive aggregate can then be adjusted more finely and so that the drive aggregate, which is coupled to the drive input shaft 4, can be operated at the most fuel-saving operating point.

In the shifting matrix of FIG. 4 the symbol X indicated that the shifting element concerned in closed and is transmitting torque, whereas the symbol (X) means that the shifting element concerned is closed but is free from load. In that case a gear is preselected.

Figure 5:
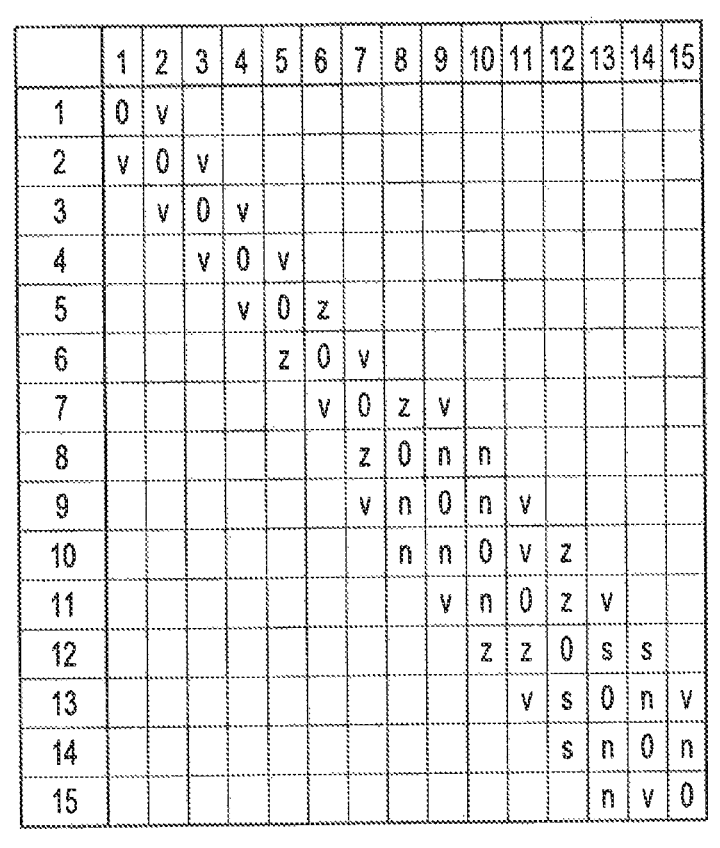

FIG. 5 shows a matrix that indicates the possible powershifts in the shifting matrix of FIG. 4; in the table of FIG. 5 the symbol v means that the gearshift concerned can be fully powershifted both in traction and in overdrive. The symbol z means that the gearshift concerned can only be fully powershifted in traction, i.e. as a traction upshift and as a traction downshift. The symbol s means that the gear concerned can only be engaged by a powershift in overdrive, i.e. as an overdrive upshift or downshift. The symbol n means that the gearshift concerned has to be carried out as a traction-force-interrupted shift. The symbol 0 means that no shift is available.

With the powershift transmission of FIG. 1, which uses the shifting matrix of FIG. 4 and accordingly provides first and second superposition gears, it is provided that when the High driving range is engaged in the downstream transmission 3 with the shifting element H closed, then to carry out a powershift while maintaining the High driving range when decelerating or accelerating the superposition gears are skipped over.

Shifts involving the first superposition gear 12 take place as described for gear 9 with reference to FIG. 3.

In the second superposition gears of the matrix in FIG. 4, predominantly only shifts with traction force interruption are possible, these second superposition gears being gears 8, 10 and 14 of the FIG. 4 shifting matrix.

A traction-force-interrupted shift to a second superposition gear is only carried out when the driving speed of the vehicle is approximately constant and/or when the driver's load demand is small, i.e. the load demand is smaller than a defined limit value.

In another further development it is provided that the second superposition gears are only used when a fuel-saving driving strategy is in force, in which traction-force-interrupted gearshifts are permitted for the purpose of reducing fuel consumption. In contrast, when the strategy in force is sporty or aims for maximum comfort so that in essence only powershifts are carried out, the second superposition gears are not used.

The driving strategy concerned can be selected by the driver by actuating a key or switch, or automatically by a driver-assistance system.

INDEXES

1 Powershift transmission
2 Main transmission
3 Downstream transmission
4 Drive input shaft
5 Drive output shaft/output shaft of the downstream transmission
6 First partial transmission
7 Second partial transmission
8 First main transmission input shaft
9 Second main transmission input shaft
10 Main transmission output shaft
11 First planetary gearset element
12 Second planetary gearset element
13 Third planetary gearset element
14 Housing
15 Input shaft of the downstream transmission
K1 First frictional powershift clutch
K2 Second frictional powershift clutch
A First shifting element
B First shifting element
C Second shifting element
D Second shifting element
E Second shifting element
F Third shifting element
G Sixth shifting element
H Fifth shifting element
L Fourth shifting element
R Seventh shifting element

The invention claimed is:

1. A method of operating a powershift transmission having:
a main transmission (2), which is a dual-clutch transmission;
a downstream transmission (3) which is a planetary gearset that is connected downstream from the main transmission (2);
the main transmission (2) having:
a first partial transmission (6) and a second partial transmission (7),
a first main transmission input shaft (8) for the first partial transmission (6),
a second main transmission input shaft (9) for the second partial transmission (7),
at least one first, interlocking shifting element of the first partial transmission (6),
at least one second, interlocking shifting element of the second partial transmission (7),
a first frictional powershift clutch (K1) connected to the first main transmission input shaft,
a second frictional powershift clutch (K2) connected to the second main transmission input shaft, and
at least one main transmission output shaft (10) that is common to both of the first and the second partial transmissions;
the downstream transmission (3) having:
a downstream transmission input shaft (15) which is connectable, via a third, interlocking shifting element (F), to the at least one main transmission output shaft (10),
a first planetary gearset element (11) being fixedly connected to the downstream transmission input shaft (15),
a downstream transmission output shaft (5) being fixedly connected to a second planetary gearset element (12), and
a third planetary gearset element (13) being couplable to either a transmission housing (14), by a fourth, interlocking shifting element (L), or to the second planetary gearset element (11, 12), by a fifth, interlocking shifting element (H);

the at least one main transmission output shaft (10) being couplable, by a sixth, interlocking shifting element (G), to the third planetary gearset element (13) of the downstream transmission; and at least one superposition gear, in which both of the first and the second frictional powershift clutches (K1, K2) are engaged, in order to be able to drive by forming, at the same time;

a first force or torque flow path starting from the first powershift clutch (K1), via the first partial transmission (6) and into the first planetary gearset element (11), and a second force or torque flow path starting from the second powershift clutch (K2), via the second partial transmission (7) and into the third planetary gearset element (13) such that, during this, the fourth shifting element (L) and the fifth shifting element (H) are both disengaged; where the method comprises the steps of:

initiating a traction upshift from a first superposition gear to a next-higher gear;

carrying out a traction downshift to a next-lower gear; and subsequently, carrying out the traction upshift from the next-lower gear, bypassing the first superposition gear, to the next-higher gear.

2. The method for operating the powershift transmission according to claim 1, further comprising the steps of:

carrying out an overdrive downshift starting from the first superposition gear to the next-lower gear, by:

first, carrying out an overdrive upshift to the next-higher gear, and then carrying out, in the overdrive downshift that skips over the first superposition gear, a shift from the next-higher gear to the next-lower gear.

3. The method for operating the powershift transmission according to claim 1, further comprising the steps of:

carrying out an overdrive upshift to the first superposition gear starting from the next-lower gear, by:

first, carrying out the overdrive upshift that skips over the first superposition gear to the next-higher gear, and then carrying out, in an overdrive downshift, a shift from the next-higher gear to the first superposition gear.

4. The method for operating the powershift transmission according to claim 1, further comprising the steps of:

carrying out the traction downshift to the first superposition gear starting from the next-higher gear, by:

first, carrying out the traction downshift that skips over the first superposition gear to the next-lower gear, and then carrying out, in the traction upshift, a shift from the next-lower gear to the first superposition gear.

5. The method for operating the powershift transmission according to claim 1, further comprising the step of, when a high driving range is engaged in the downstream transmission with the fifth shifting element (H) engaged; then, to carry out a powershift while maintaining the high driving range and either decelerating or accelerating, skipping over the at least one superposition gear.

6. The method for operating the powershift transmission according to claim 1, further comprising the step of only carrying out a traction-force-interrupted shift to a second superposition gear, when at least one of a driving speed is approximately constant and a driver's load demand is smaller than a limit value.

7. The method for operating the powershift transmission according to claim 6, further comprising the steps of:

only utilizing the second superposition gear when a fuel-saving driving strategy is active, in which, with regard to a desired fuel consumption reduction, shifts with traction force interruption are allowed, while avoiding use of the second superposition gear when a second driving strategy is active, which prioritizes one of comfort and sporty response, in which substantially only powershifts are carried out.

* * * * *